US012780567B1

(12) United States Patent
Herold

(10) Patent No.: US 12,780,567 B1
(45) Date of Patent: Nov. 3, 2026

(54) SYSTEMS AND METHOD FOR PICKING ASSEMBLY WITH ARMS AND/OR WHEELS FOR PICKING UP ITEM

(71) Applicant: Amazon Technologies, Inc., Seattle, WA (US)

(72) Inventor: Erik Herold, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 18/430,015

(22) Filed: Feb. 1, 2024

(51) Int. Cl.
*B65G 47/91* (2006.01)
*B65G 47/90* (2006.01)

(52) U.S. Cl.
CPC ........... *B65G 47/91* (2013.01); *B65G 47/905* (2013.01); *B65G 47/907* (2013.01)

(58) Field of Classification Search
CPC .... B65G 47/91; B65G 47/905; B65G 47/907; B65G 47/904
See application file for complete search history.

(56) References Cited

U.S. PATENT DOCUMENTS

| | | | | |
|---|---|---|---|---|
| 10,464,218 | B2 * | 11/2019 | Golan et al. | B25J 15/103 |
| 2021/0260775 | A1 * | 8/2021 | Mizoguchi | B25J 15/0616 |
| 2023/0067742 | A1 * | 3/2023 | Kalouche et al. | B25J 19/023 |
| 2025/0136388 | A1 * | 5/2025 | Hwang et al. | B25J 15/0028 |

FOREIGN PATENT DOCUMENTS

| | | | | |
|---|---|---|---|---|
| DE | 102013107709 A1 * | 1/2014 | | B25J 15/0004 |
| JP | 7354006 B2 * | 2/2020 | | A01D 46/30 |

* cited by examiner

*Primary Examiner* — Saul Rodriguez
(74) *Attorney, Agent, or Firm* — Eversheds Sutherland (US) LLP

(57) ABSTRACT

Systems and methods for a robotic picking assembly system with articulating arms and wheels driven by motors are provided. In one embodiment, the robotic picking assembly may include a picking assembly connected to a robotic arm and having two arms that each may bend and each may have a wheel at the end. Each wheel may be independently driven by a motor. The picking assembly may be positioned over an item in a container (e.g., bin) and the wheels may be positioned on either side of the item and caused to rotate to move the item into the picking assembly. Once the item is moved into the arms of the picking assembly, the arms may be actuated to bend to support the item for transportation. The robotic picking assembly may then move the item to a different location and place the item in the new location.

18 Claims, 9 Drawing Sheets

SYSTEMS AND METHOD FOR PICKING ASSEMBLY WITH ARMS AND/OR WHEELS FOR PICKING UP ITEM

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
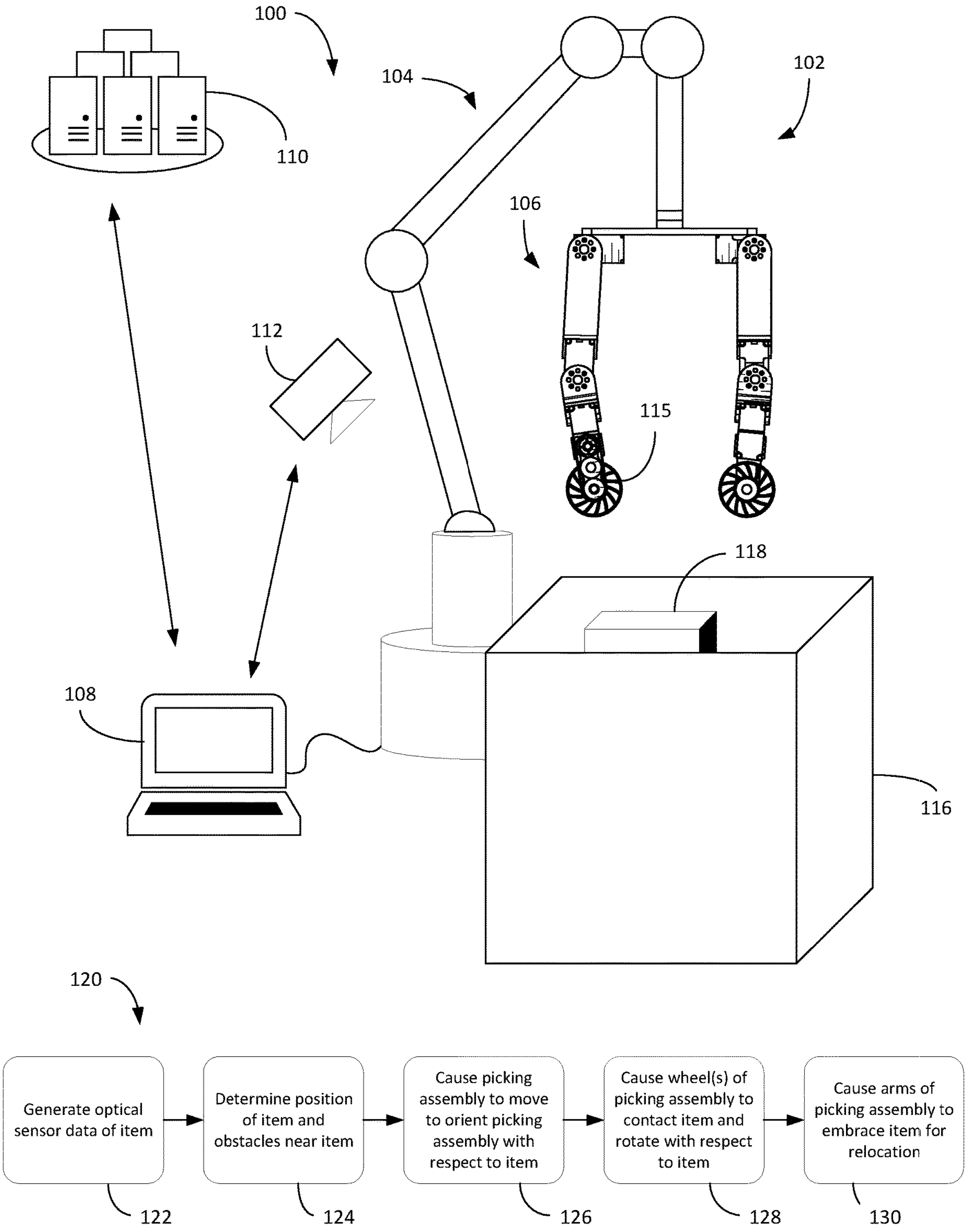
FIG. 1 is a schematic illustration of an example use case for a robotic picking assembly and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types and shapes of packaging. For example, some items may come in boxes, tubes, and in loose bags, some items may come shrink wrapped, some items may not have any packaging, and so forth. In addition, retrieving a certain number of items, such as singular items, may be difficult depending on a type of packaging in which the item comes with, the container and/or storage structure, and/or obstructions such as such container and/or storage structure, and other items in the same space. Humans may be able to manually handle individual items with ease. However, robotic handling of individual items may require various levels of dexterity.

Embodiments of the disclosure include methods and systems for automated handling of items and objects that may improve processing and fulfillment of orders, or other object aggregation tasks. Certain embodiments include robotic arms with picking assemblies in conjunction with one or more wheels and optionally vacuum suction to pick up and/or release, or otherwise handle, objects, so as to increase throughput and speed of object handling. Some embodiments include optimized methods to pick up, handle, and place difficult to access items such as items placed against a container or storage structure walls. As a result, throughput of fulfillment centers may be improved, and/or logistics of fulfillment center operations may be less complicated.

Referring to FIG. 1, an example use case 100 for a robotic picking assembly and an example process flow is depicted in accordance with one or more embodiments of the disclosure. As shown in FIG. 1, robotic picking assembly 100 may be used to pick, move, and place items (e.g., packages, objects, products, or the like) in a fulfillment center or similar setting. While only one robotic picking assembly 100 is illustrated in FIG. 1, multiple robotic picking assemblies may be positioned within or a fulfillment or similar center for picking, moving, and/or placing items.

Robotic picking assembly 100 may include robotic system 104, picking assembly 102, and/or controller 108. Robotic arm system 104 may be a multi-axis robotic arm system having multiple segments and designed to articular and otherwise move to achieve multiple degrees of freedom (e.g., six-degrees of freedom). Alternatively, robotic arm system 104 may be any other suitable robotic system for moving an end effector and/or assembly at a distal end from one location to another and/or adjusting the orientation of the end effector and/or assembly.

Picking assembly 102 may be connected to robotic system 104 and may be selectively rotated with respect robotic assembly 104. The orientation and position of picking assembly 106 may be manipulated as desired by actuating, contorting, and/or otherwise moving robotic system 104. Robotic picking assembly 102 may further include controller 108 which may be a standalone device or may be incorporated into robotic system 104. Controller 108 may cause robotic system 104 and picking assembly 102 to move to one or more desired positions, and/or may actuate motors (e.g., brushed gearmotors and/or servos), actuators, and/or any other components of picking assembly 102.

Controller 108 may communicate with server 110 which may be one or more servers in the same location (e.g., same fulfillment center) as robotic system 104 or may be a remote server. Controller 108 may also communicate with one or more one or more optical sensors (e.g., image sensor 112), which may be a camera or other suitable optical sensor. Alternatively, or additionally, proximity and/or other distance sensors may be used. Image sensor 112 may be a standalone component and/or may be integrated into robotic system 104 and/or picking assembly 102.

Controller 108 may be any type of computing device (e.g., computers, desktop computers, laptop computers, datastores, and/or any other electronic or computing device) having a processor and optionally a display (e.g., laptop, desktop, tablet, smartphone, server, etc.). Controller 108 may communicate with image sensor 112 and/or server 110 via any well-known wired or wireless system (e.g., Bluetooth, Bluetooth Low Energy (BLE), near field communication protocol, Wi-Fi, cellular network, etc.). Controller 108 may process information and/or perform operations and tasks described herein alone or together with server 110.

Server 110 may be one or more servers, computers, desktop computers, laptop computers, datastores, and/or any other electronic or computing device. Server 110 may oversee operation of a fulfillment center and may communicate information to controller 108 such as items for transportation, destinations within the fulfillment center for delivery of the item, and other relative information about picking and/or placing an item. Server 110 may be in communication with multiple robotic picking assemblies.

Picking assembly 102 may include arms 106 which may be rotatably attached such that each arm may independently rotate with respect to the rest of picking assembly 102 (e.g., via a motor). Each arm 106 may include multiple segments which may rotate relative to one another such that each arm may bend. For example, motors at a joint connecting each arm segment may cause the arms to move relative to one another. One or more of arm may further include a wheel (e.g., wheel 115) at the end of the arm. The wheel may be selectively rotated by a motor. When the wheel is placed into contact with an item, the wheel may be rotated to move the item in a desired direction. As shown in FIG. 1, each arm may have a wheel and each wheel may contact the item on either side of the item and rotate to cause the item to move toward picking assembly 102. Robotic picking assembly 100 may include one or more components or features described in U.S. Pat. No. 11,077,564 issued on Aug. 3, 2021 and assigned to Amazon Technologies, Inc., and/or U.S. patent application Ser. No. 18/467,082, filed on Sep. 14, 2023, and assigned to Amazon Technologies, Inc., the entire contents of each of which are incorporated herein by reference. While picking assembly 102 is illustrated as including two arms in FIG. 1, it is understood that picking assembly 102 may include fewer than two arms or greater than two arms (e.g., three arms, four arms, etc.).

As shown in FIG. 1, robotic picking assembly 106 may be positioned adjacent to one or more containers or storage structures containing items. For example, bin 116 may contain items including item 118 picking assembly 102 may be positioned adjacent to bin 116 such that picking assembly 106 may be positioned over bin 116 and/or over item 118 to cause picking assembly 106 to be lowered into bin 116 for retrieval of item 118. Picking assembly 102 may move to contact the item with the wheels and may rotate the wheels to move the item towards the picking assembly and out bin 116.

To pick up an item and transport the item from one place (e.g., location) to another, process flow 120 may be initiated. At block 122 a position of the item in multi-dimensional (e.g., three-dimensional) space may be determined as well as the position of a support structure (e.g., bin) and surrounding obstructions (e.g., other items). For example, image sensor 112 may be directed towards bin 116 and item 118 and may capture optical data representative of the location of item 118 with respect to bin 116 and/or other obstacles or structure surrounding item 118. At block 124, the position of the item and obstacles near the item may be determined based on the image data (e.g., via automated image analysis).

At block 126, the picking assembly may be caused to move to orient the picking assembly with respect to the item. For example, robotic system 104 may be actuated or otherwise articulated to move picking assembly over a peripheral edge of item 118. At block 128, picking assembly 104 may also be caused to move to position one or both of arms 106 to cause at least one wheel to contact item 118. For example, motors (e.g., brushed gearmotors, servos, gear motors, belt driven motors, and/or any other suitable motors) connected to arm segments may move the arms to place one or more wheel in contact with the item. Once the wheel or wheels have made contact with the item, the wheels may be rotated to cause the item to move towards picking assembly 104. For example, friction between the wheels and the item may cause the item to move in the direction of rotation. In one example, the wheels may be at least partially elastic and may deform to at least partially conform to the shape of the item.

At block 130 arms 106 of picking assembly 102 may be further rotated or otherwise actuated to cause arms 106 to embrace item 118. For example, arms 106 may each include two arm segments and the arms be rotated inward to support beneath item 118 as item 118 is moved upward via rotation of the wheels. In this manner, item 118 may be secured by picking assembly 102 and picking assembly 102 may then transport item 118 to a different location (e.g., by moving robotic system 104).

Illustrative Embodiments and Use Cases

Figure 2:
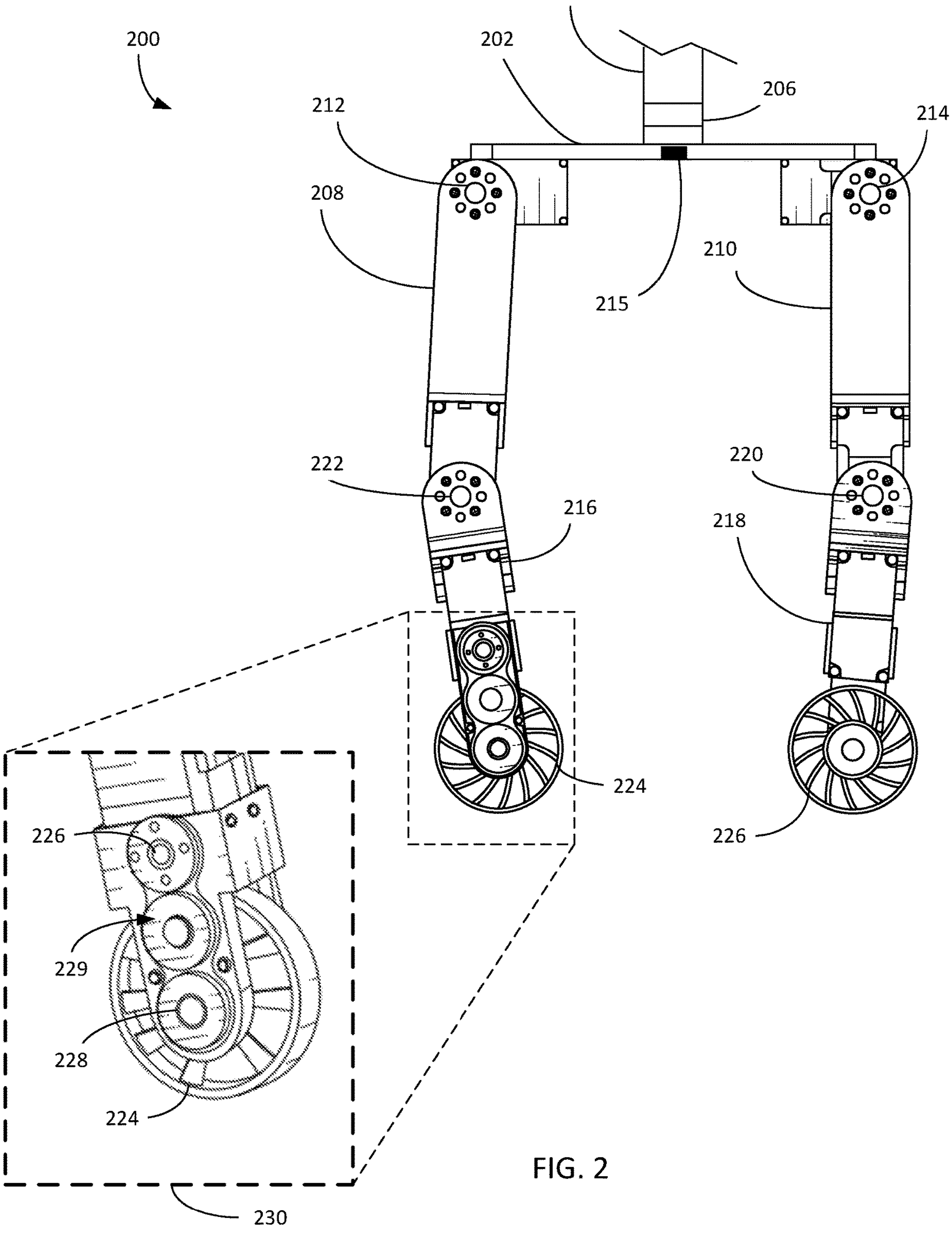
FIG. 2 is a schematic illustration of an exemplary picking assembly in accordance with one or more embodiments of the disclosure.

FIG. 2 is a schematic illustration of an exemplary picking assembly in accordance with one or more embodiments of the disclosure. Other embodiments may include additional or fewer components. The illustration of FIG. 2 may not be to scale, and may not be illustrated to scale with respect to other figures. Picking assembly 200 illustrated in FIG. 2 may be the same as or similar to picking assembly 102 of FIG. 1.

In FIG. 2, picking assembly 200 may include base portion 200 which may connect to arm 204 which may be an end of the robotic system. In one example, base portion 202 may optionally include optical sensor 215 for imaging an item and/or surrounding environment. The optical sensor may further be used to determine when the item has been picked up by the gripper and moved sufficiently toward base portion 202 for the arms of the picking assembly to bend to embrace the item. In one example, picking assembly 200 may be rotatably coupled to arm 204 such that picking assembly 200 may rotate with respect to arm 204. Motor 206 may cause picking assembly 202 to rotate with respect to arm 204.

Picking assembly 202 may further include arms 208 and 210 which may be rotatably connected to base portion 202 at either end of base portion 202 such that arms 208 and 210 may rotate with respect to base portion. Picking assembly 202 may further include may include motors 212 and 214, which may be coupled to base portion 202 and arms 208 and 210, respectively, and may cause arms 208 and 210 to rotate with respect to base portion 202, respectively. Arm 208 may be rotatably connected to arm 216 such that arm 216 may rotate with respect to arm 208 and arm 218 may be rotatably connected to arm 210 such that arm 218 may rotate with respect to arm 208. Picking assembly 202 may further include motor 222 connected to arm 216 and arm 208 to cause arm 216 to rotate with respect to arm 208 and motor 220 connected to arm 210 and arm 218 to cause arm 218 to rotate with respect to arm 210. Motors 206, 212, 214, 222 and/or 220 may be any well-known motors such as servos, gear motors, belt driven motors, and the like. Motors 206, 212, 214, 222 and/or 220 may be independently actuated.

Arms 216 and 218 may each have a free end connected to a wheel. Specifically, arm 216 may be connected to wheel 224 and arm 218 may be connected to wheel 226. Wheels 224 and 226 may include an outer surface with a high friction material for gripping an item. Additionally, or alternatively, wheels 224 and 226 may be made of an elastic material and May deform such that wheels 224 and 226 may at least partially deform from a circular shape to a non-circular shape to conform to a shape of the item.

Arms 216 and 218 may include a motor to cause rotation of respective wheels at the ends of arms 216 and 218. For example, arm 216 may include motor 226 which may drive wheel 224. Motor may be connected to a hub 228 of wheel 224 via a set of gears 229 which may be arranged in sequence and may be sized to translate rotational movement from motor 226 to wheel 224. Set of gears 229 may include multiple gears (e.g., three gears) with interlocking teeth. In one example, a desired torque applied to the wheel may be achieved by sizing the one or more of the set of gears to achieve the desired torque. Arm 218 may similarly include a motor and a set of gears to drive wheel 226.

Figure 3:
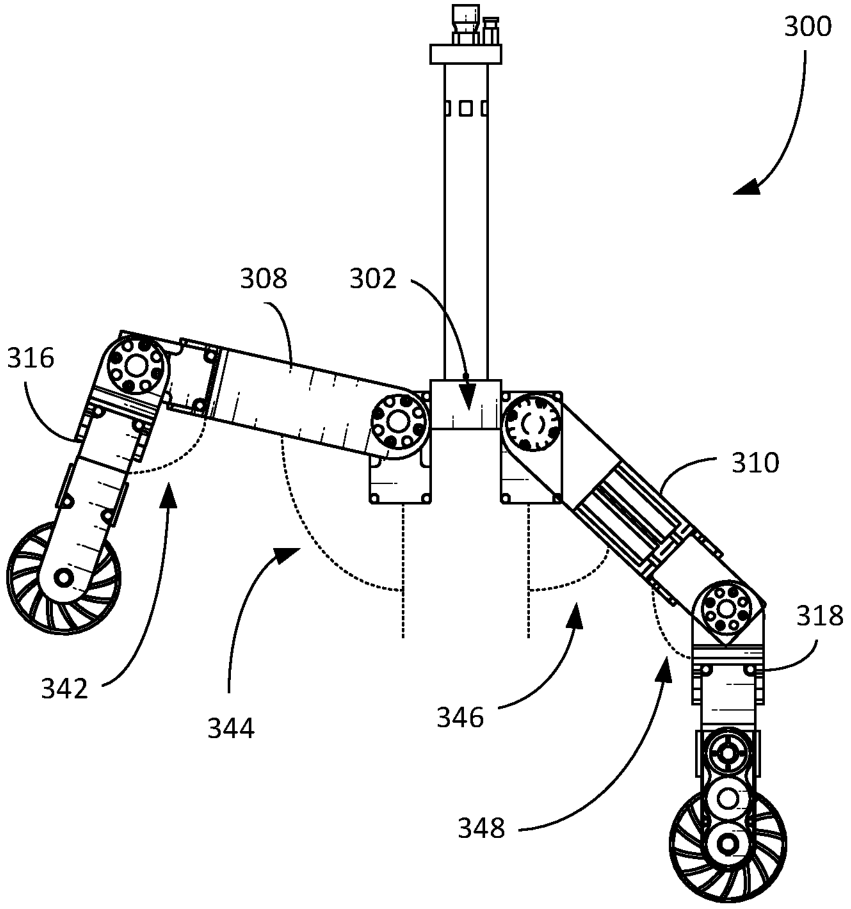
FIG. 3 is a schematic illustration of an exemplary picking assembly with independently movable arms in accordance with one or more embodiments of the disclosure.

Referring now to FIG. 3, a schematic illustration of an exemplary picking assembly with independently movable arms is depicted in accordance with one or more embodiments of the disclosure. Picking assembly 300 may be the same as or similar to picking assembly 200. As shown in FIG. 3, arm 308 may be moved to angle 344 with respect to base portion 302 and arm 310 may be moved to angle 346 which respect to base portion 302. Angles 344 and 346 may be different angles. Further arm 308 may be move to angle 342 with respect arm 316 and arm 310 may be moved to angle 348 with respect to arm 318. Angles 342 and 348 may similarly be different angles.

While angles 344 and 346 may be different angles, alternatively arms 308 and 310 may be in mechanical communication via a geared connection to cause arms 308 and 310 to move in unison. In this example, only one motor may drive arms 308 and 310. In another example, angles 344 and 346 may always be the same and angles 348 and 346 may always be the same such that arms 308 and 316 mirror the movements of arms 310 and 318.

Figure 4:
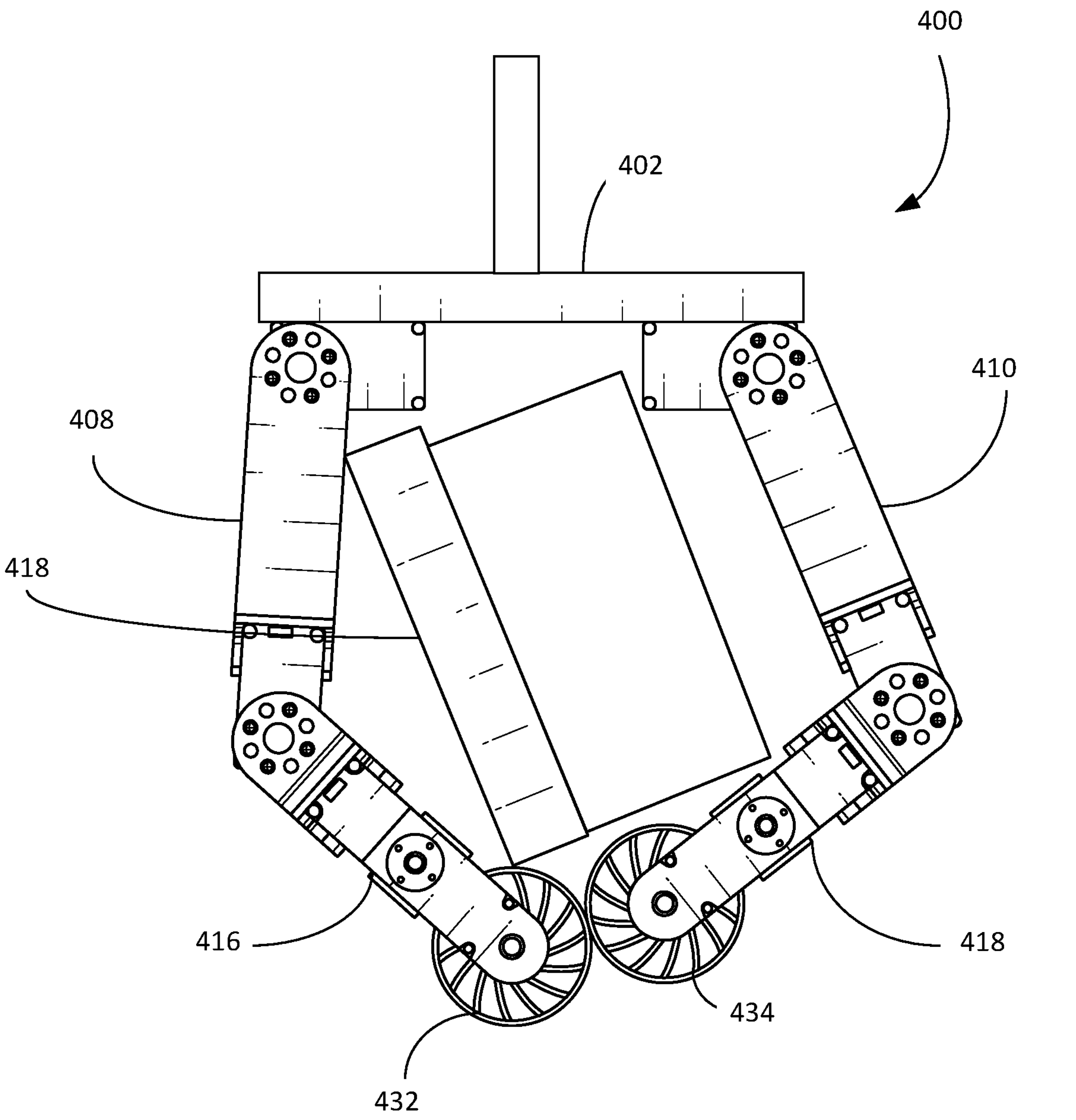
FIG. 4 is a schematic illustration of an exemplary picking assembly with bent arms for securing an item in accordance with one or more embodiments of the disclosure.

Referring now to FIG. 4, a schematic illustration of an exemplary picking assembly with bent arms for securing an item is depicted in accordance with one or more embodiments of the disclosure. Picking assembly 400 may be the same as or similar to picking assembly 400. As shown in FIG. 4, motors of picking assembly 4 have been actuated to embrace item 418 for transportation.

To secure item 418, as item 418 is moved upward towards base portion 402 via wheels 432 and 434, arm 416 may be rotated toward arm 408 to cause wheel 432 to move toward wheel 434. Similarly, as item 418 is moved upward towards base portion 402 via wheels 432 and 434, arm 418 may be rotated toward arm 410 to cause wheel 434 to move toward wheel 432. In this manner, arms 416 and 418 and wheels 432 and 434 may be positioned beneath item 418 to support item 418 as picking assembly 400 is moved from one location to another (e.g., by a robotic system).

Figure 5A:
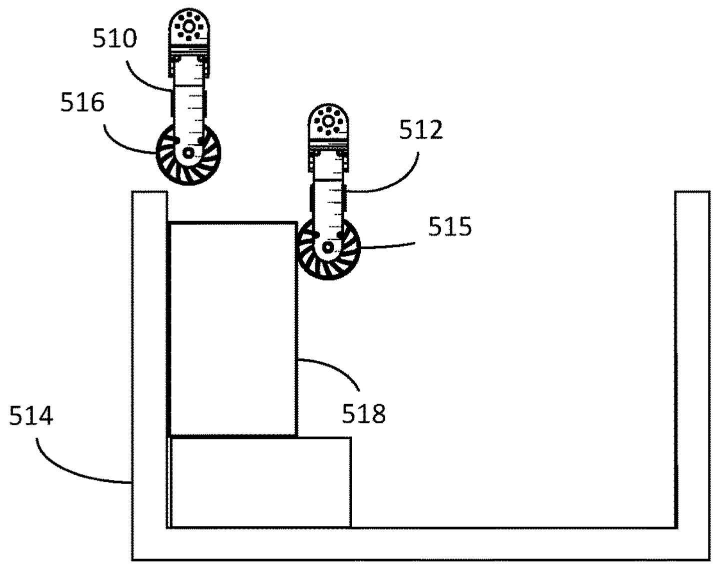
FIGS. 5A-5C are schematic illustrations of example use cases for extracting and moving a package for using a picking assembly with wheels in accordance with one or more embodiments of the disclosure.
Figure 5B:
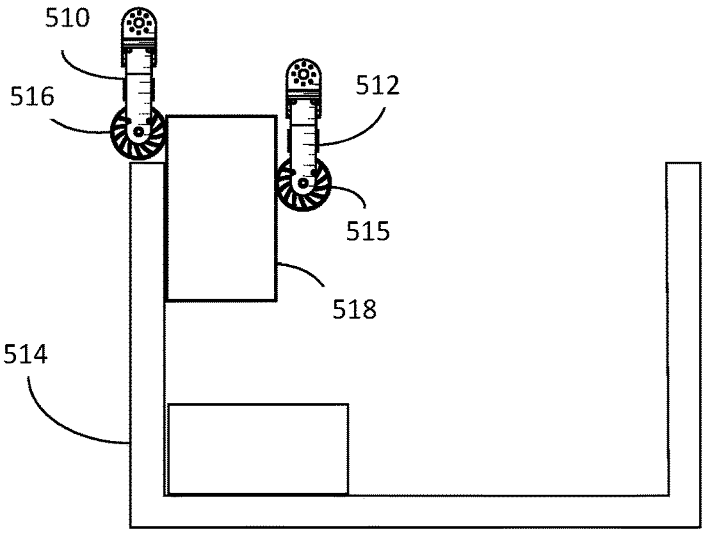

Referring now to FIGS. 5A-5B, schematic illustrations of example use cases for extracting and moving a package using a picking assembly with wheels in accordance with one or more embodiments of the disclosure. As shown in FIG. 5A, arms 510 and 512 may be positioned over a peripheral edge of item 518. Arms 518 and 512 may extend from a picking assembly which may be the same as picking assembly 200. For example, arms 518 and 512 may be the same as or similar to arms 216 and 218 of FIG. 2. Item 518 may be pressed up against an internal wall of bin 514 and to pick up item 518, only wheel 515 of arm 512 may be positioned in contact with item 518.

As shown in FIG. 5B, wheel 514 may be rotated clockwise while maintaining contact with item 518 to cause item 518 to move upward along the interior wall of bin 814. Wheel 516 and arm 510 may optionally make contact with bin 514 to prevent bin 514 from tipping. As item 518 moves upward beyond the wall of bin 514, arm 510 may cause wheel 516 to make contact with item 518. Wheel 516 may then be caused to rotate counterclockwise while maintain contact with item 518 and while wheel 515 continues to rotate clockwise.

Figure 5C:
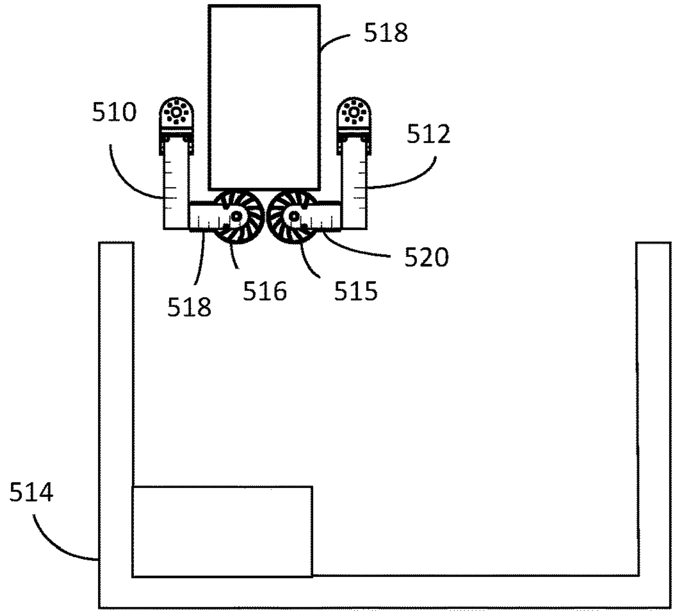

As shown in FIG. 5C, once item 518 is raised to a certain height (e.g., the bottom of item 518 is above wheels 516 and 515), arms 510 and 512 may embrace item 518 for transportation. For example, arms 510 and 512 may each include two portions joined together and configured to rotate with respect to one another. For example, arms 510 and 512 may be the same as or similar to arms 106 of FIG. 1. Motors connecting the two arm portions may cause arm portions 518 and 520 to rotate with respect to arms 510 and 512, respectively, such that wheels 516 and 515 are positioned closer to one another and arm portions 518 and 515 are positioned beneath item 518 to support item 518 for transportation.

Figure 6:
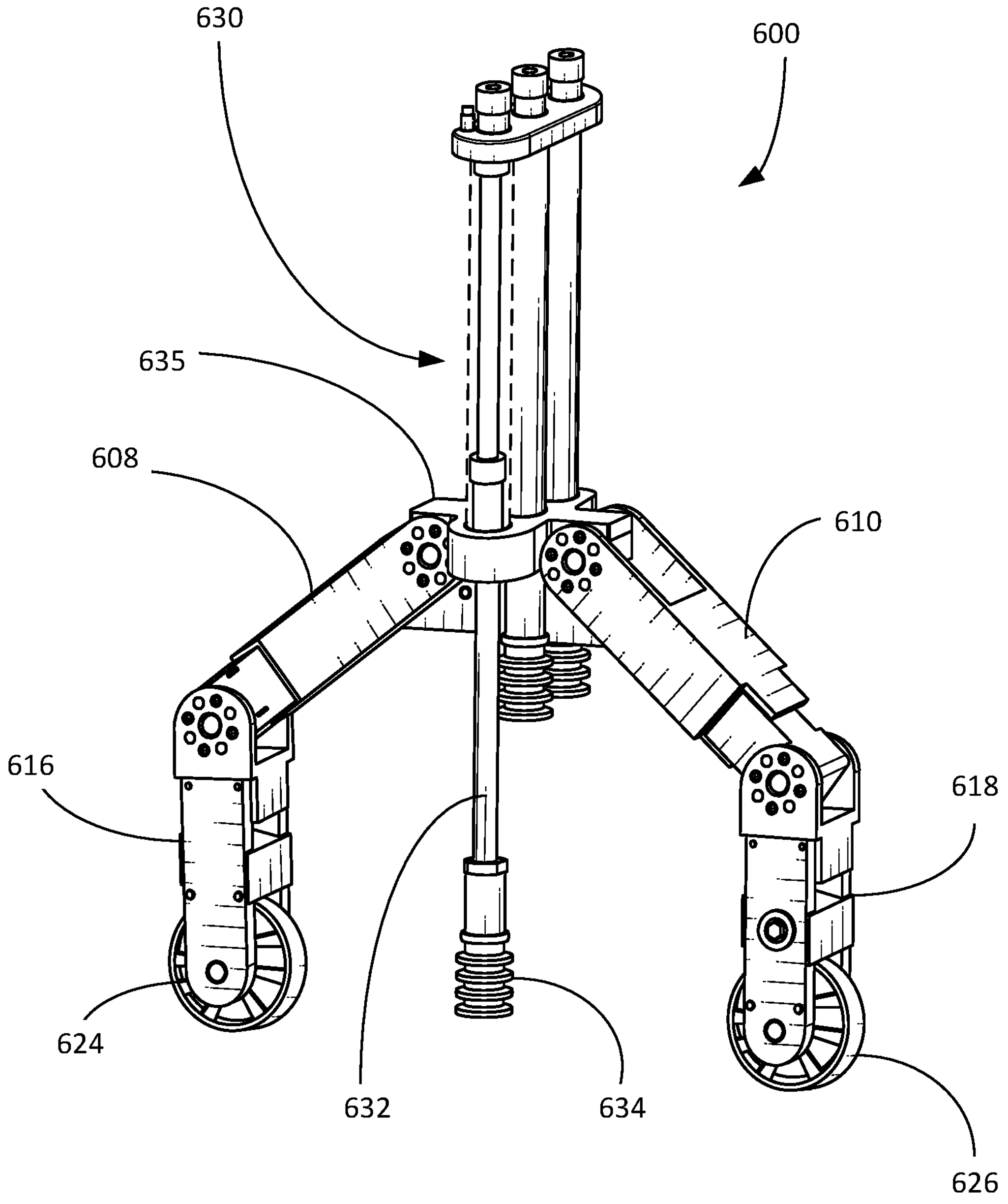
FIG. 6 is a schematic illustration of an exemplary picking assembly with a suction device for applying a negative pressure to a surface of an item in accordance with one or more embodiments of the disclosure.

Referring now to FIG. 6, a schematic illustration of an exemplary picking assembly with a suction device for applying a negative pressure to a surface of an item is depicted in accordance with one or more embodiments of the disclosure. Picking assembly 600 may be substantially similar to picking assembly 200 of FIG. 2 and may include legs 608 and 616 with wheel 634 and motors to cause legs 608 and 616 rotate and a motor to cause wheel 634 to rotate. Picking assembly 600 may further include legs 610 and 618 with wheel 626 and motors to cause legs 610 and 618 rotate and a motor to cause wheel 626 to rotate.

Legs 608 and 610 may be positioned on either side of base portion 635 and vacuum suction device 630 may be connected to base portion 635 between legs 608 and 610. Vacuum device 630 may include telescoping portion 632 which may extend away from base portion 635 and towards an item. Telescoping portion 632 may be connected to elastic portion 634 designed to deform and/or otherwise conform to a surface of an item. Vacuum device 630 may be connected to a vacuum pump to apply a negative pressure to the surface of the item via elastic portion 634 to pick up the item. Multiple telescoping portions and elastic portions may be included in vacuum device 630 and may be independently extendable and/or actuated.

Figure 7:
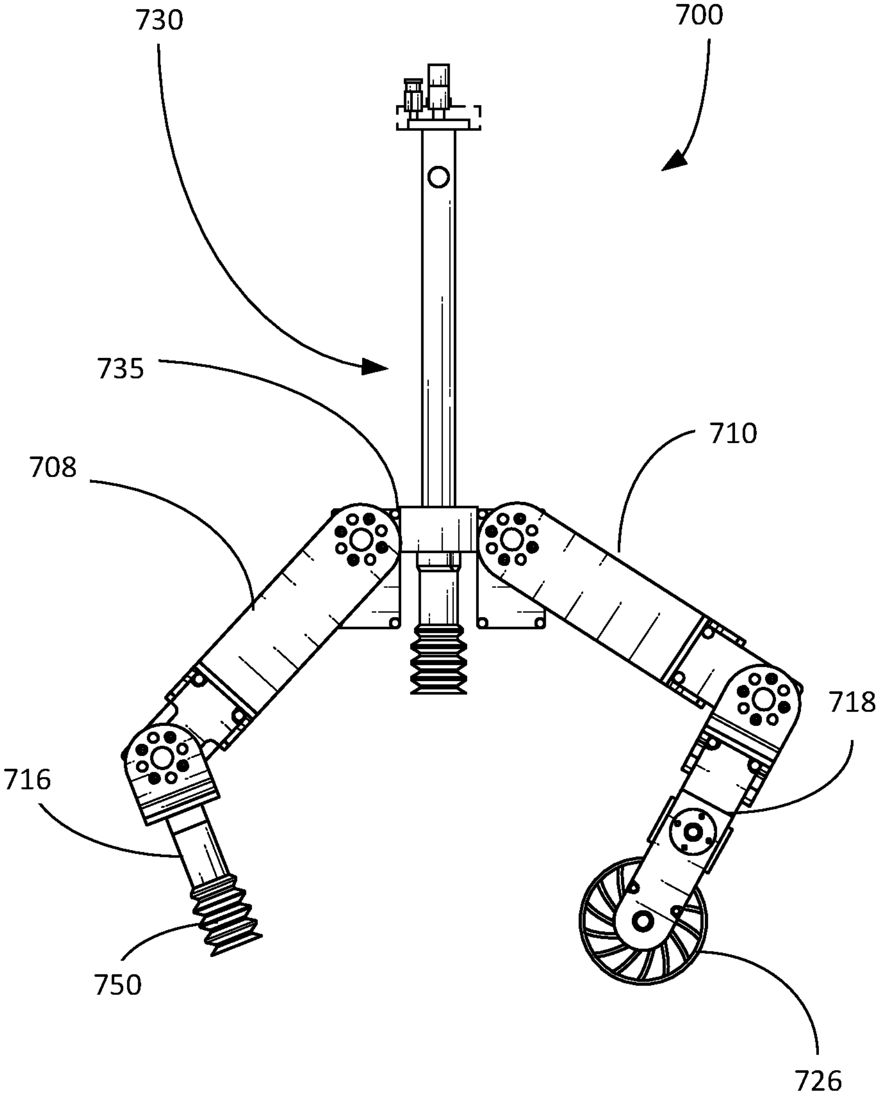
FIG. 7 is a schematic illustration of an alternative picking assembly including a vacuum suction device and arm with a vacuum component in accordance with one or more embodiments of the disclosure.

Referring now to FIG. 7, a schematic illustration of an alternative picking assembly including a vacuum device and an arm with a vacuum component is depicted in accordance with one or more embodiments of the disclosure. Picking assembly 700 may be substantially similar to picking assembly 600 and may include base portion 735, legs 708 and 716, and motors to cause legs 708 and 716 to rotate with respect to one another. Picking assembly 700 may further include legs 710 and 718 with wheel 726 and motors to cause legs 710 and 718 rotate with respect to one another and a motor to cause wheel 726 to rotate. Picking assembly 700 may further include vacuum device 730 between legs 708 and 710 as well as vacuum component 750 at the end of arm 716. Vacuum component 750 may be vacuum suction device and may include an elastic portion designed to deform and/or otherwise conform to a surface of an item. Vacuum component 750 may be connected to a vacuum pump to apply a negative pressure to the surface of the item via vacuum component 750 to pick up the item.

Figure 8:
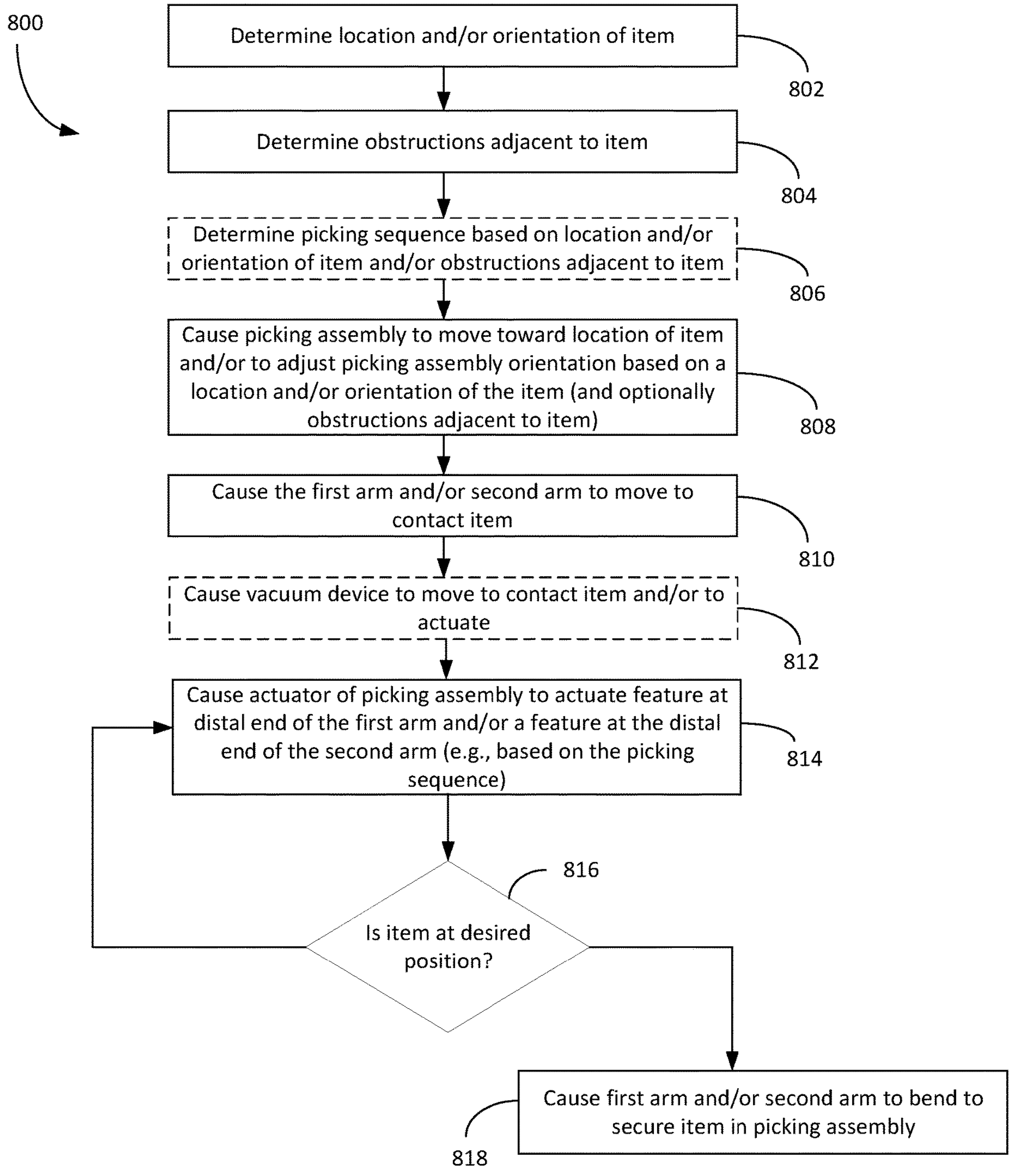
FIG. 8 is a schematic illustration of an exemplary process flow for picking up an item using a picking assembly in accordance with one or more embodiments of the disclosure.

Referring now to FIG. 8, process flow 800 for picking up an item using a picking assembly is illustrated in accordance with one or more embodiments of the disclosure. It is understood that one or more blocks of process flow 800 may be optional and/or may be performed in a different order. Process flow 800 may be performed by controller 108 of FIG. 1, for example.

To initiate process flow 800, at block 802, computer-executable instructions stored on a memory of a device, such as a controller, may be executed to determine a location and/or orientation of an item. An optical sensor may be used to determine sensor data, such as image data showing the item and surrounding environment. At block 804, computer-executable instructions stored on a memory of a device, such as a controller, may be executed to determine obstructions that are adjacent to the item. This may be based on the sensor data. The obstructions may be other items and/or support structure.

At optional block 806, computer-executable instructions stored on a memory of a device, such as a controller, may be executed to determine a picking sequence based on the location and/or orientation of the item and/or obstructions. Picking sequence may be a sequence of motor movements of a picking assembly including arm movements, wheel movements, and other motor movements for positioning of the picking assembly and/or movement of the picking assembly to ultimately result in picking up the item.

At block 808, computer-executable instructions stored on a memory of a device, such as a controller, may be executed to cause a picking assembly (e.g., picking assembly 200 of FIG. 2) to move toward the item and/or to adjust the orientation of the picking assembly based on a location and/or orientation of the item determined at block 802 and optionally any obstructions adjacent to the item. For example, a robotic system may be used to adjust the orientation and/or location (e.g., position) of the picking assembly. At block 810, computer-executable instructions stored on a memory of a device, such as a controller, may be executed to cause a first arm of the picking assembly and/or a second arm to contact the picking assembly (e.g., via a wheel at the end of the first arm and/or a wheel or other feature (e.g., vacuum device) at the end of the second arm).

At optional block 812, computer-executable instructions stored on a memory of a device, such as a controller, may be executed to cause a vacuum device of the picking assembly to move and/or expand away from the picking assembly and towards the item to contact the item and/or actuate to apply a negative pressure to the item. The vacuum device may optionally retract to pull the item closer to the picking assembly.

At block 814, computer-executable instructions stored on a memory of a device, such as a controller, may be executed to cause the actuator of the picking assembly to actuate a component or feature at a distal end of the first arm and/or second arm (e.g., wheel, vacuum device, etc.), which may optionally be based on the picking sequence. For example, a motor may cause a wheel to rotate and/or a vacuum suction device to generate a negative air pressure.

At decision 816, computer-executable instructions stored on a memory of a device, such as a controller, may be executed to determine whether an item is at a desired position with respect to the picking assembly for securing the item. For example, an optical sensor on the picking device may be used to determine if a bottom end of the item is above the wheels. If the item is at a not at the desired position with respect to the picking assembly, block 814 may be reinitiated or may continue to be initiated.

Alternatively, if the item is at the desired position with respect to the picking assembly, at block 818, computer-executable instructions stored on a memory of a device, such as a controller, may be executed to cause an actuator of the picking assembly to cause first arm and/or second arm to bend inward to secure the item in the picking assembly (e.g., to embrace the item). For example, the first arm and second arm may each include two portions that may rotate with respect to one another and each may be caused to rotate with respect to one another to position the ends of the first arm and the second arm beneath the item for transportation. It is understood that a package may be placed at a desired location by first straightening the legs and then causing the wheel(s) and/or vacuum suction device to release the item (e.g., rotate the wheels in the opposite direction and/or cease negative pressure).

Illustrative Computer Architecture

Figure 9:
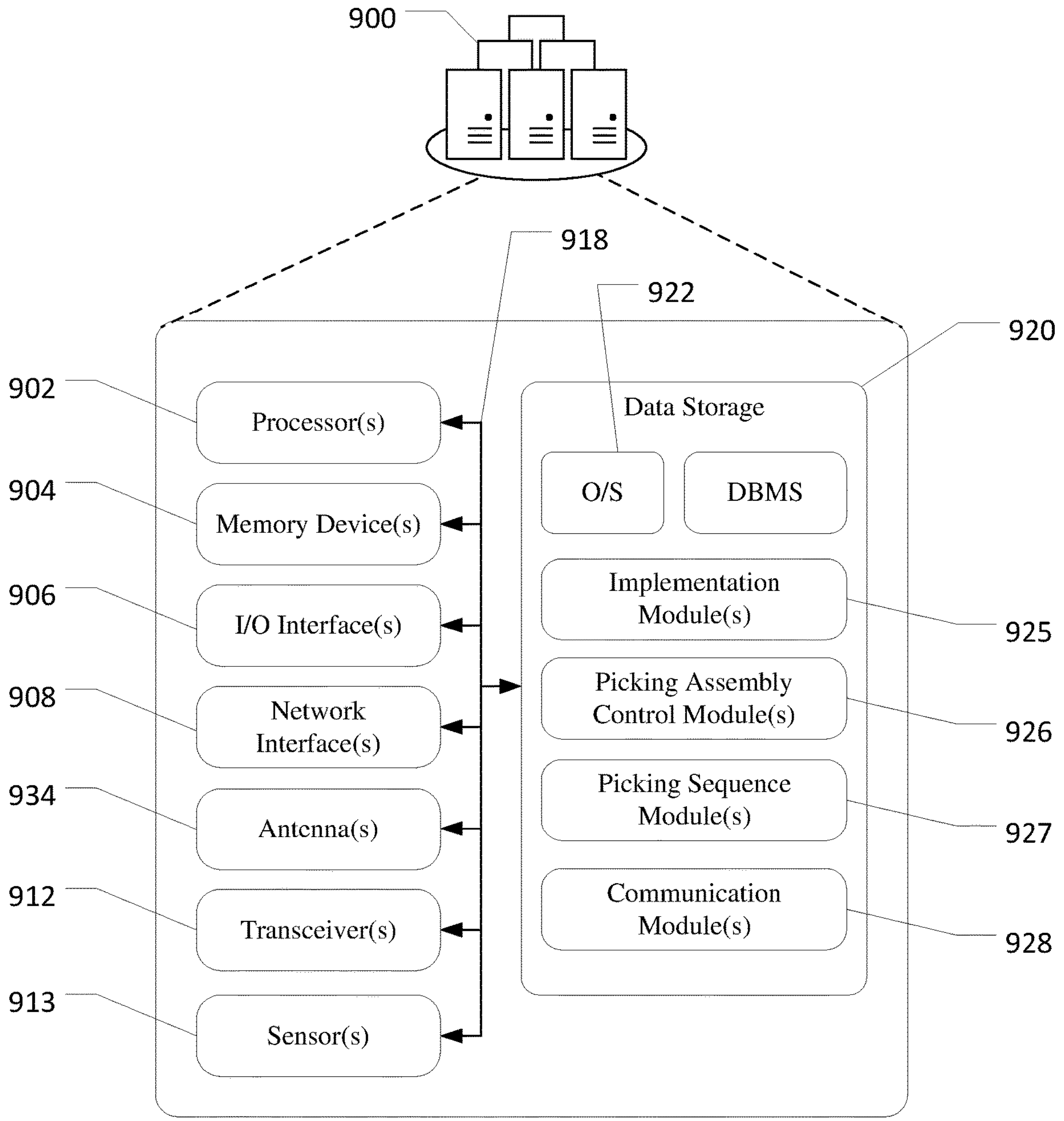
FIG. 9 schematically illustrates an example architecture of a controller associated with a robotic picking assembly in accordance with one or more embodiments of the disclosure.

FIG. 9 is a schematic block diagram of one or more illustrative controller(s) 900 in accordance with one or more example embodiments of the disclosure. The controller(s) 900 may include any suitable computing device including, but not limited to, a desktop computer, a laptop, server, or the like. The controller(s) 900 may correspond to an illustrative device configuration for the device(s) of FIGS. 1-8. For example, the controller(s) 900 may control one or more aspects of the robotic picking assembly described in FIGS. 1-8.

Controller 600 may be configured to communicate via one or more networks or communication links (e.g., radio frequency (RF), Bluetooth Low Energy (BLE), etc.) with one or more electronic devices, charging devices, controllers, user devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the controller 600 may include one or more processors (processor(s)) 902, one or more memory devices 904 (generically referred to herein as memory 904), one or more input/output (I/O) interface(s) 906, one or more network interface(s) 908, one or more transceivers 912, one or more sensor(s) 913, one or more antenna(s) 934, and data storage 920. The controller 600 may further include one or more buses 918 that functionally couple various components of the controller 600. The controller 600 may further include one or more antenna (e) 934 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the controller 600. The bus(es) 918 may include, without limitation, a memory bus or a memory controller, a peripheral bus, a display bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the controller 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more optional database management systems (DBMS) 934; and one or more program module(s), applications, engines, computer-executable code, scripts, or the like such as, for example, one or more implementation module(s) 925, picking assembly control module(s) 926, one or more picking sequence module(s) 927, and/or one or more communication module(s) 928. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the controller 600. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the controller 600 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 6, the implementation module(s) 925 may include computer-executable instructions, code, or the like that responsive to execution by one or more of the processor(s) 902 may perform functions including, but not limited to, determining charge values, analyzing values in the log of charge values, comparing values in the log of charge values to predetermined values (e.g., maximum time differential, quantization error, maximum fluction values), and determining adjusted charge readings).

The picking assembly control module module(s) 926 may include computer-executable instructions, code, or the like that responsive to execution by one or more of the processor (s) 902 may perform functions including, but not limited to controlling actuation and/or function the various motors, actuators, pumps, and/or sensors of the robotic picking assembly system.

The data logging module(s) 927 may include computer-executable instructions, code, or the like that responsive to execution by one or more of the processor(s) 902 may perform functions including, but not limited to, determine a location or position of the items and/or obstructions and determining a sequence of orientations, positions, and/or actuations or movements of the robotic picking assembly system.

The communication module(s) 928 may include computer-executable instructions, code, or the like that responsive to execution by one or more of the processor(s) 902 may perform functions including, but not limited to, communicating with one or more devices, for example, via wired or wireless communication, communicating with controllers, multi-level storage structures, sensors, servers, user devices, conveyor devices, fulfillment center devices and delivery vehicles, communicating with servers (e.g., remote servers), communicating with remote datastores and/or databases, sending or receiving notifications or commands/directives, communicating with cache memory data, and the like.

Referring now to other illustrative components depicted as being stored in the data storage 920, the O/S 922 may be loaded from the data storage 920 into the memory 904 and may provide an interface between other application software executing on the controller 600 and hardware resources of the controller 600. More specifically, the O/S 922 may include a set of computer-executable instructions for managing hardware resources of the controller 600 and for providing common services to other application programs (e.g., managing memory allocation among various application programs). In certain example embodiments, the O/S 922 may control execution of the other program module(s) to for content rendering. The O/S 922 may be any operating system now known or which may be developed in the future including, but not limited to, any server operating system, any mainframe operating system, or any other proprietary or non-proprietary operating system.

The optional DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the controller 600, the optional input/output (I/O) interface(s) 906 may facilitate the receipt of input information by the controller 600 from one or more I/O devices as well as the output of information from the controller 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; and so forth. Any of these components may be integrated into the controller 600 or may be separate. The I/O devices may further include, for example, any number of peripheral devices such as data storage devices, printing devices, and so forth.

The I/O interface(s) 906 may also include an interface for an external peripheral device connection such as universal serial bus (USB), Fire Wire, Thunderbolt, Ethernet port or other connection protocol that may connect to one or more networks. The I/O interface(s) 906 may also include a connection to one or more of the antenna (e) 934 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The controller 600 may further include one or more network interface(s) 908 via which the controller 600 may communicate with any of a variety of other systems, platforms, networks, devices, and so forth. The network interface(s) 908 may enable communication, for example, with one or more wireless routers, one or more host servers, one or more web servers, and the like via one or more of networks. The one or sensor(s) 913 may be optical sensors, for example.

The antenna (e) 934 may include any suitable type of antenna depending, for example, on the communications protocols used to transmit or receive signals via the antenna (e) 934. Non-limiting examples of suitable antennas may include directional antennas, non-directional antennas, dipole antennas, folded dipole antennas, patch antennas, multiple-input multiple-output (MIMO) antennas, or the like. The antenna (e) 934 may be communicatively coupled to one or more transceivers 912 or radio components to which or from which signals may be transmitted or received.

As previously described, the antenna (e) 934 may include a Bluetooth antenna configured to transmit or receive signals in accordance with established standards and protocols, such as Bluetooth and/or BLE. Alternatively, or in addition to, antenna (e) 934 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (e) 934 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 934 may be configured to transmit or receive radio frequency signals within any suitable frequency range forming part of the unlicensed portion of the radio spectrum (e.g., 900 MHz).

The antenna (e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), Quasi-Zenith Satellite System (QZSS), the GLONASS System, the Compass Navigation System, the Galileo System, or the Indian Regional Navigational System.

The transceiver(s) 912 may include any suitable radio component(s) for—in cooperation with the antenna (e) 934—transmitting or receiving radio frequency (RF) signals in the bandwidth and/or channels corresponding to the communications protocols utilized by the controller 600 to communicate with other devices. The transceiver(s) 912 may include hardware, software, and/or firmware for modulating, transmitting, or receiving—potentially in cooperation with any of antenna (e) 934—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the controller 600. The transceiver(s) 912 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 920, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the controller 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the controller 600 may include alternate and/or additional hardware, software, or firmware components beyond those described or depicted without departing from the scope of the disclosure. More particularly, it should be appreciated that software, firmware, or hardware components depicted as forming part of the controller 600 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:

a robotic arm;

a picking assembly coupled to the robotic arm and configured to pick up and release items, the picking assembly comprising:

a base portion:

a first arm configured to rotate with respect to the base portion;

a first motor coupled to the first arm and the base portion and configured to cause the first arm to rotate with respect to the base portion;

a second arm coupled to the first arm and configured to rotate with respect to the first arm;

a second motor coupled to the second arm and the first arm and configured to cause the second arm to rotate with respect to the first arm;

a third arm configured to rotate with respect to the base portion independent of the first arm;

a third motor coupled to the third arm and the base portion and configured to cause the third arm to rotate with respect to the base portion;

a fourth arm coupled to the third arm and configured to rotate with respect to the third arm;

a fourth motor coupled to the fourth arm and the third arm and configured to cause the fourth arm to rotate with respect to the third arm;

a first wheel disposed at an end of the second arm;

a second wheel disposed at an end of the fourth arm;

a fifth motor disposed on the second arm and configured to cause the first wheel to rotate, wherein the second arm comprises a first set of gears in mechanical communication with the fifth motor and the first wheel and configured to translate rotational movement from the fifth motor to the first wheel; and a sixth motor disposed on the fourth arm and configured to cause the second wheel to rotate, wherein the fourth arm comprises a second set of gears in mechanical communication with the sixth motor and the second wheel and configured to translate rotational movement from the sixth motor to the second wheel.

2. The robotic picking assembly of claim 1, further comprising:

a controller configured to cause the picking assembly to pick up an item by:

positioning the picking assembly over a peripheral edge of the item;

actuating the first motor and the second motor to cause the first wheel to contact the item;

actuating the third motor and the fourth motor to cause the second wheel to contact the item;

causing the fifth motor to rotate the first wheel in a first angular direction while maintaining contact with the item; and causing the sixth motor to rotate the second wheel in a second angular direction opposite the first angular direction while maintaining contact with the item.

3. The robotic picking assembly of claim 2, wherein the controller is further configured to cause the picking assembly to pick up the item by, after causing the fifth motor to rotate the first wheel and the sixth motor to rotate the second wheel:

causing the second motor to rotate the second arm with respect to the first arm such that the first wheel moves closer to the second wheel and a first angle formed between the first arm and the second arm is reduced; and causing the fourth motor to rotate the fourth arm with respect to the third arm such that the second wheel moves closer to the first wheel and a second angle formed between the third arm and the fourth arm is reduced.

4. The robotic picking assembly of claim 1, further comprising:

a vacuum suction device disposed in the base portion between the first arm and the third arm and having a distal end configured to extend away from the base portion to contact a surface of the item and apply a negative air pressure to the surface of the item.

5. A robotic picking assembly comprising:

a base portion;

a first arm rotatably coupled to the base portion;

a first motor coupled to the first arm and the base portion and configured to cause the first arm to rotate with respect to the base portion;

a second arm coupled to the first arm and configured to rotate with respect to the first arm;

a second motor coupled to the second arm and the first arm configured to cause the second arm to rotate with respect to the first arm;

a first wheel disposed at an end of the second arm;

a third motor disposed on the second arm and configured to cause the first wheel to rotate, wherein the second arm comprises a set of gears in mechanical communication with the third motor and the first wheel and configured to translate rotational movement from the third motor to the first wheel;

a third arm rotatably coupled to the base portion; and a fourth motor configured to cause the third arm to rotate with respect to the base portion.

6. The robotic picking assembly of claim 5, further comprising:

a second wheel disposed at an end of the third arm; and a fifth motor configured to cause the second wheel to rotate, wherein the first motor, second motor, third motor, and fourth motor are selectively and independently actuated to cause at the first wheel together with the second wheel to pick up and release items.

7. The robotic picking assembly of claim 5, wherein the third arm comprises a first portion and a second portion, the second portion configured to rotate with respect to the first portion and having the second wheel at an end of the second portion, the robotic picking assembly further comprising:

a fifth motor configured to cause the second portion to rotate with respect to the first portion.

8. The robotic picking assembly of claim 5, further comprising:

a controller configured to cause the picking assembly to pick up an item by:

positioning the picking assembly over a peripheral edge of the item;

actuating at least the first motor to cause the first wheel to contact the item; and causing the third motor to rotate the first wheel while the first wheel maintains contact with the item.

9. The robotic picking assembly of claim 5, further comprising:

a vacuum suction device disposed in the base portion between the first arm and the third arm and having a distal end configured to extend away from the base portion to contact a surface of the item and apply a negative air pressure to the surface of the item.

10. The robotic picking assembly of claim 5, further comprising a vacuum suction device disposed on an end of the third arm and configured to contact a surface of the item and apply a negative air pressure to the surface of the item.

11. The robotic picking assembly of claim 5, wherein the first wheel is elastic and is configured to deform when it contacts the item.

12. A method comprising:

positioning a picking assembly over a peripheral edge of the item, the picking assembly comprising a base portion, a first arm rotatably coupled to the base portion, a first motor coupled to the first arm and the base portion, a second arm rotatably coupled to the first arm, a second motor coupled to the first arm and the second arm, a first wheel disposed at an end of the second arm, a third motor coupled to the second arm and the first wheel, wherein the second arm comprises a set of gears in mechanical communication with the third motor and the first wheel and configured to translate rotational movement from the third motor to the first wheel, a third arm rotatably coupled to the base portion, and a fourth motor coupled to the base portion and the third arm;

actuating the first motor to cause the first arm to rotate with respect to the base portion and actuating the second motor to cause the second arm to rotate with respect to the first arm to cause the first wheel to contact the item;

causing the fourth motor coupled to the third arm and the base portion to rotate the third arm with respect to the base portion to cause the third arm to contact the item; and causing the third motor to rotate the first wheel while the first wheel maintains contact with the item to pick up the item.

13. The method of claim 12, wherein the third arm has a second wheel at a distal end and a fifth motor configured to cause the second wheel to rotate, the second wheel configured to contact the item.

14. The method of claim 13, wherein the third motor causes the first wheel to rotate in a first angular direction, the method further comprising causing the fifth motor to rotate the second wheel in a second angular direction different from the first angular direction while the second wheel maintains contact with the item.

15. The method of claim 12, wherein the picking assembly further comprises a vacuum suction device disposed in the base portion between the first arm and the third arm and having a distal end configured to extend away from the base portion to contact a surface of the item and apply a negative air pressure to the surface of the item.

16. The method of claim 15, further comprising:

causing the vacuum suction device to expand and contact the surface of the item; and actuating a vacuum to apply the negative air pressure to the surface of the item.

17. The method of claim 12, wherein the picking assembly is coupled to a robotic arm configured to position the picking assembly over a peripheral edge of the item.

18. The method of claim 17, further comprising causing the robotic arm to move the picking assembly together with the item from a first location over the peripheral edge of the item to a second location.

* * * * *